United States Patent
Duan et al.

(10) Patent No.: US 11,070,637 B2
(45) Date of Patent: Jul. 20, 2021

(54) METHOD AND DEVICE FOR ALLOCATING AUGMENTED REALITY-BASED VIRTUAL OBJECTS

(71) Applicant: ADVANCED NEW TECHNOLOGIES CO., LTD., Grand Cayman (KY)

(72) Inventors: Qinglong Duan, Hangzhou (CN); Guanhua Chen, Hangzhou (CN); Jing Ji, Hangzhou (CN); Jiahui Cheng, Hangzhou (CN); Lu Yuan, Hangzhou (CN)

(73) Assignee: ADVANCED NEW TECHNOLOGIES CO., LTD, Grand Cayman (KY)

( * ) Notice: Subject to any disclaimer, the term of this patent is extended or adjusted under 35 U.S.C. 154(b) by 0 days.

(21) Appl. No.: 16/422,673

(22) Filed: May 24, 2019

(65) Prior Publication Data
US 2019/0289084 A1    Sep. 19, 2019

Related U.S. Application Data

(63) Continuation of application No. PCT/CN2017/114457, filed on Dec. 4, 2017.

(30) Foreign Application Priority Data

Dec. 13, 2016    (CN) .......................... 201611146660.6

(51) Int. Cl.
*H04L 29/08*    (2006.01)
*G06F 3/0482*    (2013.01)
(Continued)

(52) U.S. Cl.
CPC ............ *H04L 67/20* (2013.01); *G06F 3/0482* (2013.01); *G06K 9/2054* (2013.01);
(Continued)

(58) Field of Classification Search
CPC ... G06T 11/60; G06T 2200/24; G06F 3/0482; G06K 9/2054; G06K 9/2063; H04L 67/38; H04L 67/20; H04L 63/0823; G06Q 20/10
See application file for complete search history.

(56) References Cited

U.S. PATENT DOCUMENTS 8,285,638 B2    10/2012    Jung et al.
8,547,401 B2    10/2013    Mallinson et al.
(Continued)

FOREIGN PATENT DOCUMENTS

CN    204423405 U    6/2015
CN    105303410    2/2016
(Continued)

OTHER PUBLICATIONS

Notice of Allowance for Korean Application No. 10-2019-7016767 dated Dec. 17, 2019 (5 pages).
(Continued)

*Primary Examiner* — Michael Le

(57) ABSTRACT

Methods, systems, and apparatus, including computer programs encoded on computer storage media, for a virtual objection distribution method are provided. One of the methods includes: performing an image scanning to a local environment of a user; conducting image identification to an acquired image; acquiring an electronic certificate from a server if an image identifier is identified in the image; saving the electronic certificate; and, in response to a determination that a category count of the received electronic certificates reaches the threshold, sending to the server a virtual object distribution request to cause the server to distribute a virtual object to the user. This method significantly increases interactivity and entertainingness of a virtual object distribution process.

20 Claims, 8 Drawing Sheets

(51) Int. Cl.
  *G06K 9/20* (2006.01)
  *G06Q 20/10* (2012.01)
  *G06T 11/60* (2006.01)
  *H04L 29/06* (2006.01)

(52) U.S. Cl.
  CPC .......... *G06K 9/2063* (2013.01); *G06Q 20/10* (2013.01); *G06T 11/60* (2013.01); *H04L 67/38* (2013.01); *G06T 2200/24* (2013.01)

(56) References Cited

U.S. PATENT DOCUMENTS

| | | | |
|---|---|---|---|
| 8,645,220 B2 | 2/2014 | Harper et al. | |
| 9,087,399 B2 | 7/2015 | Shuster et al. | |
| 9,396,354 B1 | 7/2016 | Murphy et al. | |
| 9,429,752 B2 | 8/2016 | Schowengerdt et al. | |
| 9,623,334 B2 | 4/2017 | Anderson et al. | |
| 9,754,414 B2 | 9/2017 | Kim et al. | |
| 2001/0034635 A1* | 10/2001 | Winters | G06Q 30/0233 705/14.33 |
| 2002/0028708 A1* | 3/2002 | Busch | G06Q 20/206 463/42 |
| 2007/0093299 A1 | 4/2007 | Bergeron et al. | |
| 2007/0203828 A1 | 8/2007 | Jung | |
| 2010/0194782 A1 | 8/2010 | Gyorfi et al. | |
| 2011/0153362 A1 | 6/2011 | Valin et al. | |
| 2011/0276379 A1 | 11/2011 | Shaw et al. | |
| 2012/0011025 A1 | 1/2012 | Hunt | |
| 2012/0054002 A1 | 3/2012 | Rotbard et al. | |
| 2012/0113140 A1 | 5/2012 | Hilliges et al. | |
| 2012/0120113 A1 | 5/2012 | Hueso | |
| 2012/0154557 A1 | 6/2012 | Perez et al. | |
| 2013/0106910 A1 | 5/2013 | Sacco | |
| 2013/0310169 A1* | 11/2013 | Satsuma | A63F 13/00 463/30 |
| 2014/0132484 A1 | 5/2014 | Pandey et al. | |
| 2014/0240523 A1* | 8/2014 | Dodla | G06F 16/434 348/207.1 |
| 2014/0297429 A1 | 10/2014 | Kikuchi | |
| 2014/0306866 A1 | 10/2014 | Miller et al. | |
| 2015/0124106 A1 | 5/2015 | Tomita | |
| 2016/0071326 A1 | 3/2016 | Spivack | |
| 2016/0178380 A1* | 6/2016 | Iwaizumi | G01C 21/3682 701/409 |
| 2016/0234193 A1 | 8/2016 | Chen et al. | |
| 2016/0335289 A1 | 11/2016 | Andrews | |
| 2016/0350782 A1* | 12/2016 | Wang | G06Q 20/405 |
| 2018/0033147 A1* | 2/2018 | Becker | G06K 9/00449 |
| 2019/0163529 A1 | 5/2019 | Gao et al. | |

FOREIGN PATENT DOCUMENTS

| | | |
|---|---|---|
| CN | 105591885 | 5/2016 |
| CN | 105634926 | 6/2016 |
| CN | 105894255 A | 8/2016 |
| CN | 105938604 A | 9/2016 |
| CN | 106096924 A | 11/2016 |
| CN | 106888203 A | 6/2017 |
| JP | 2012-221132 A | 11/2012 |
| JP | 2014-191608 A | 10/2014 |
| JP | 2014-238815 A | 12/2014 |
| JP | 2015-090553 A | 5/2015 |
| KR | 1020130130740 A | 12/2013 |
| KR | 1020150084980 A | 7/2015 |
| KR | 1020150126938 A | 11/2015 |
| TW | 201629862 A | 8/2016 |
| WO | 2007/035618 A2 | 3/2007 |
| WO | 2014/182545 A1 | 11/2014 |

OTHER PUBLICATIONS

Search Report for European Application No. 17881652.6 dated Apr. 15, 2020.
Sammelbild-Aktion "Penny dreht durch" war ein voller Erfolg: PENNY.de, Sep. 26, 2011, retrieved from: https://www.penny.de/unternehmen/presse/presse-detail/article/sammelbild-aktion-penny-dreht-durch-war-ein-voller-erfolg/. [English machine translation provided].
Office Action and Search Result for Taiwanese Application No. 106132572 dated Dec. 24, 2018 (3 pages).
Written Opinion of the International Searching Authority and International Search Report for PCT Application No. PCT/CN2017/114457 dated Feb. 22, 2018 (16 pages).
International Preliminary Report on Patentability Chapter I for PCT Application No. PCT/CN2017/114457 dated Jun. 27, 2019 (12 pages).
First Search for Chinese Application No. 201611146660.6 dated Sep. 7, 2019 (1 page).
First Office Action for Chinese Application No. 201611146660.6 dated Sep. 18, 2019 with English machine translation (7 pages).
Office Action for Japanese Application No. 2019-552324 dated Jun. 30, 2020.
Nikkei Digital Marketing, Textbook of Omni-Channel & O2O, Japan, Nikkei Business Publications, Inc. Sep. 20, 2016, Fist Edition, p. 97.
Universe AR Solution, C&C User Forum & iEXPO2014, Japan, NEC Corporation, Nov. 20, 2014.
Substantive Examination Clear Report for Malaysian Application No. PI 2019002899 dated Dec. 28, 2020.

* cited by examiner

METHOD AND DEVICE FOR ALLOCATING AUGMENTED REALITY-BASED VIRTUAL OBJECTS

CROSS-REFERENCE TO RELATED APPLICATION

This application is a continuation application of International Patent Application No. PCT/CN2017/114457, filed on Dec. 4, 2017, which is based on and claims priority to the Chinese Patent Application No. 201611146660.6, filed on Dec. 13, 2016 and entitled "METHOD AND DEVICE FOR ALLOCATING AUGMENTED REALITY-BASED VIRTUAL OBJECTS." The above-referenced applications are incorporated herein by reference in their entirety.

TECHNICAL FIELD

This application relates to the field of augmented reality (AR) technologies, in particular to a method and device for distributing an AR-based virtual object.

BACKGROUND

With the development of the Internet technologies, a variety of virtual object distribution methods have emerged. In traditional Chinese or Eastern Asian culture, a "red packet" may refer to a small red envelope with some monetary gift in it. As a way to show a sender's blessing, a red packet may be sent to a family member or a friend as a gift in special occasions such as wedding, new year, etc. In the Internet era, virtual red packets, which may be sent and received through a mobile device such as a smartphone, are becoming increasingly popular. Taking the virtual red packet distribution as an example, in conventional distribution methods, a user may include items such as an electronic greeting card, gift cash, etc. into a virtual red packet and send it, through a mobile device, to another user or a group of users. With increasingly diverse distribution scenarios of virtual objects, increasing interactivity and entertainingness of a virtual object distribution process play an essential role in improving user experiences of an associated application.

SUMMARY

Various embodiments of the present specification can include systems, methods, and non-transitory computer readable media for exchange and synchronization of status information of method and device for distributing augmented reality-based virtual objects.

This application provides a virtual object distribution method. This method includes performing an image scanning to a local environment of a user, conducting image identification to an image acquired by the image scanning, and determining whether an image identifier is identified in the image.

The virtual object distribution method may further include, in response to a determination that the image identifier is identified in the image, acquiring an electronic certificate from a server, saving the electronic certificate, determining whether a category count of received electronic certificates reaches a threshold, and, in response to a determination that the category count reaches the threshold, sending to the server a virtual object distribution request. The virtual object distribution request may contain a plurality of electronic certificates that have a category count equals to the threshold. In response to the virtual object distribution request, the server may distribute a virtual object to the user.

This application further provides a device for distributing a virtual object. This device may comprise one or more processors and one or more non-transitory machine-readable memories coupled to the one or more processors and configured with instructions executable by the one or more processors to cause the device to perform operations. The operations may include performing an image scanning to a local environment of a user, conducting image identification to an image acquired by the image scanning, and determining whether an image identifier is identified in the image. The operations may further include, in response to a determination that the image identifier is identified in the image, acquiring an electronic certificate from a server, saving the electronic certificate, determining whether a category count of received electronic certificates reaches a threshold, and, in response to a determination that the category count reaches the threshold, sending to the server a virtual object distribution request. The virtual object distribution request may contain a plurality of electronic certificates that having a category count equals to the threshold. In response to the virtual object distribution request, the server may distribute a virtual object to the user.

This application further provides a non-transitory computer-readable storage medium associated with a virtual object distribution method, configured with instructions executable by one or more processors to cause the one or more processor to perform operations.

The operations may include performing an image scanning on a local environment of a user, conducting image identification to an image acquired by the image scanning, and determining whether an image identifier is identified in the image. The operations may further include, in response to a determination that the image identifier is identified in the image, acquiring an electronic certificate from a server, saving the electronic certificate, determining whether a category count of received electronic certificates reaches a threshold, and, in response to a determination that the category count reaches the threshold, sending to the server a virtual object distribution request. The virtual object distribution request may contain a plurality of electronic certificates that having a category count equals to the threshold. In response to the virtual object distribution request, the server may distribute a virtual object to the user.

This application discloses an interactive method that, based on Augmented Reality (AR) technology, combines a user's online request for a virtual object with the user's image scanning operation on a local environment. The user may scan a local image that includes a preset image identifier. The scanning may cause a server to distribute an electronic certificate for obtaining a virtual object. The electronic certificate received may be saved, and once a category count the received electronic certificates reaches a preset threshold, the user may send a distribution request to the server to request the server to distribute a virtual object. The distribution request may include electronic certificates that have a category count of the preset threshold. Upon receiving the distribution request, the server may select a virtual object from a preset virtual object set and send it to the user. This method significantly increases interactivity and entertainingness of a virtual object distribution process.

These and other features of the systems, methods, and non-transitory machine-readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

Embodiments of this application will be described in details below with reference to the accompanying drawings to fully illustrate the purposes, characteristics and advantages of the aforementioned methods and devices.

DETAILED DESCRIPTION OF THE EMBODIMENTS

This application provides an interactive method that, based on AR technology, combines a user's online request for a virtual object with that user's image scanning operation on a local environment using an AR client.

In some embodiments, a user can actively perform, using the AR client, an image scanning on a local image that includes a preset image identifier. The user then may send to image scanning result to an AR server to cause the AR server to distribute to the AR client an electronic certificate for obtaining a virtual object. The electronic certificate the AR client receives may be saved in the AR client, and once a category count of the received electronic certificates in the AR client reaches a preset threshold, the user may send a distribution request to the AR server to request a virtual object distribution. The distribution request may include the received electronic certificates that have a category count of the preset threshold. Upon receiving the distribution request, the AR server may select a virtual object from a preset virtual object set and send it to the user. This method significantly increases interactivity and entertainingness of a virtual object distribution process.

For example, in a scenario wherein the aforementioned virtual object is a "virtual red packet", a user may scan a local image that includes a preset image identifier using an AR client to cause an AR server to distribute to the AR client an electronic certificate for obtaining a red packet. The electronic certificate the user received may be saved in the AR client. Once a category count of the received electronic certificates the user collected reaches a preset threshold, the user may send a distribution request to the AR server to request a virtual red packet distribution. The distribution request may include the received electronic certificates that have a category count of the preset threshold. Upon receiving the distribution request, the AR server may select a virtual red packet of a certain monetary amount from a preset "red packet cash pool" and send the virtual red packet to the user. This method significantly increases interactivity and entertainingness of a virtual red packet distribution process.

This application will be described below through specific embodiments with references to specific application scenarios.

Figure 1:
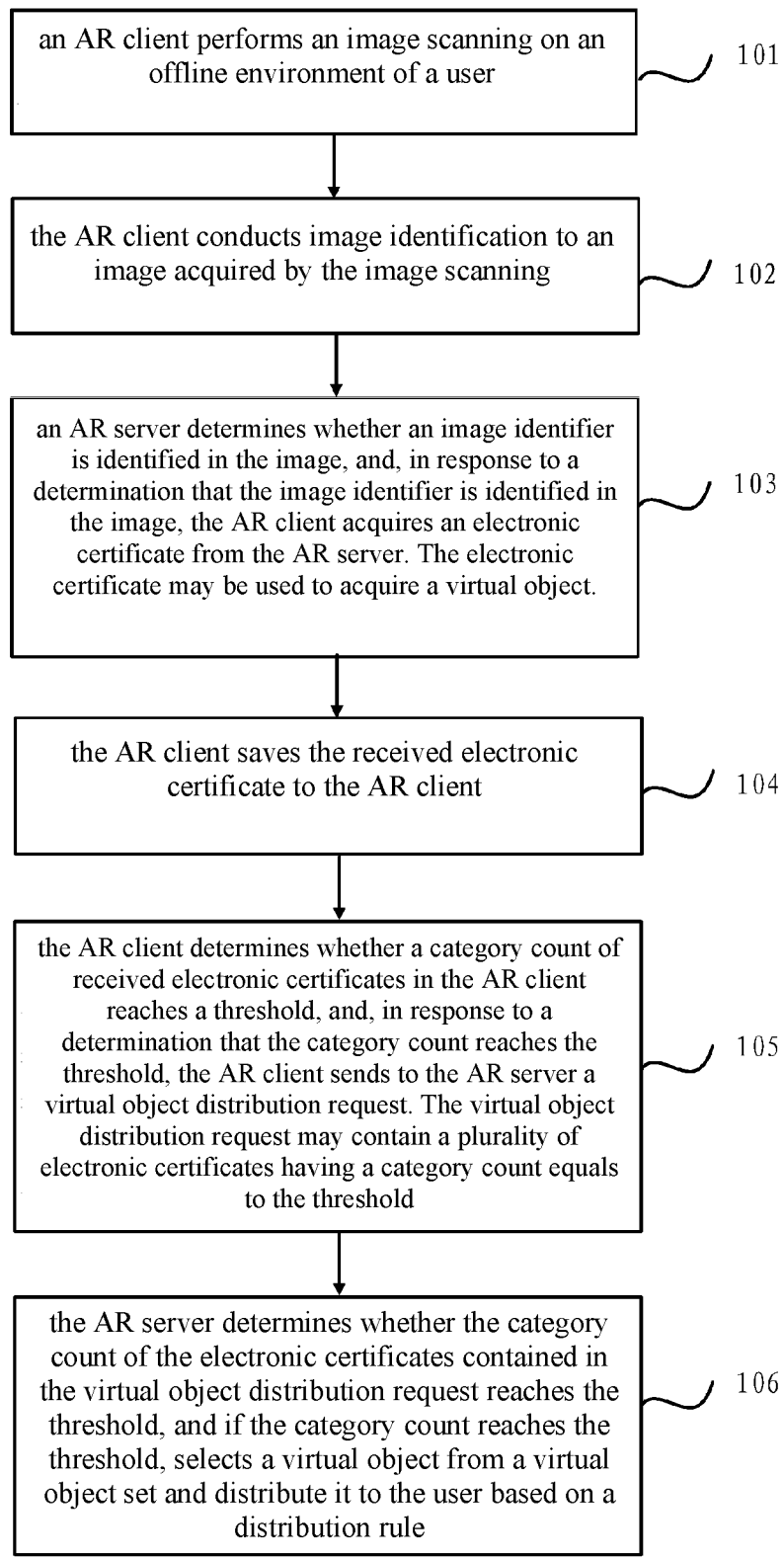
FIG. 1 shows a flowchart illustrating a virtual object distribution method for an AR client in this application.

FIG. 1 shows a flowchart illustrating a virtual object distribution method for an AR client in this application. Referring to FIG. 1, this method may include the following steps.

At step 101: an AR client performs an image scanning on a local environment of a user.

At step 102: the AR client conducts image identification to an image acquired by the image scanning.

At step 103: an AR server determines whether an image identifier is identified in the image, and, in response to a determination that the image identifier is identified in the image, the AR client acquires an electronic certificate from the AR server. The electronic certificate may be used to acquire a virtual object.

At step 104: the AR client saves the received electronic certificate to the AR client.

At step 105: the AR client determines whether a category count of received electronic certificates in the AR client reaches a threshold; and, in response to a determination that the category count reaches the threshold, the AR client sends to the AR server a virtual object distribution request. The virtual object distribution request may contain a plurality of electronic certificates having a category count equals to the threshold.

At step 106: the AR server determines whether the category count of the electronic certificates contained in the virtual object distribution request reaches the threshold, and if the category count reaches the threshold, selects a virtual object from a virtual object set and distributes it to the user based on a distribution rule.

The aforementioned AR client may be client software developed based on the AR technology or those integrated with AR functions. For example, an AR client may be an Alipay client with AR service functions. The AR client may be used for performing an image scanning on a local environment, transmitting the scanned image to the AR server in real time, performing, through an AR engine of the AR client, visual rendering on virtual data received from the AR server, and superposing and integrating the virtual data with the scanned image data (such as a real scene image) of the local environment.

The aforementioned AR server may include a server providing services to the AR client, a server cluster, or a cloud platform built based on the server cluster. For example, the AR server may be a payment platform providing docking services for an Alipay Application (APP) with AR service functions. The AR server may be used for identifying the image scanned by the AR client based on the AR engine in the background (obviously, the image identification process may also be completed by the AR client based on the AR engine in the foreground). The AR server may also be used for performing content management on virtual data related to a local business, and pushing the related virtual data to the AR client based on an image identification result. For example, the AR server may locally perform content management on an electronic certificate for obtaining a virtual object, and transmit the electronic certificate to the AR client based on the image identification result.

The aforementioned virtual object may be any type of virtual article which can be distributed online. For example, in some embodiments, the virtual object may be a virtual red packet, digital money, or other monetary gift.

The aforementioned electronic certificate may refer to a certificate for the user to obtain a virtual object from the AR server. In some embodiments, the AR server can be preset with a certain number of different categories of electronic certificates and distribute different categories of electronic certificates to specific user groups according to a distribution rule. A specific form of the aforementioned electronic certificate is not limited and it may be a character string, a number, a character, a password, a virtual card, etc.

The aforementioned image identifier may include any form of image identifier which may be defined in advance on the AR server and may have a binding relationship with the electronic certificates preset on the AR server for obtaining a virtual object. In some embodiments, those skilled in the art can customize the image identifier based on actual requirements.

The technical solution shown in steps 101-106 will be described in details below using an example wherein the aforementioned virtual object is a virtual red packet.

Obviously, "virtual red packet" is just one possible example of the virtual object. In some embodiments, other than a virtual red packet, the virtual object may also be other virtual article which can be distributed and transmitted online, such as an electronic certificate, an electronic retail voucher, and an electronic coupon.

In some embodiments, a certain number of different categories of electronic certificates can be preset on the AR server, and the preset electronic certificates may are associated with the image identifier. A user may perform an image scanning on local environment that includes the image identifier using the AR client to cause the AR server to send to an electronic certificate for obtaining a virtual object to the AR client. Upon receiving the electronic certificate, the AR client may save the electronic certificate in the AR client.

When a category count of received electronic certificates in the AR client reaches a preset threshold, the user may request the distribution of a red packet from the AR server. The AR client can actively send to the AR server a red packet distribution request. The distribution request may contain a plurality of electronic certificates having a category count equal to the preset threshold. Upon receiving the distribution request, the AR server may select a red packet of a certain monetary amount from a preset "red packet cash pool" and distribute it to the user. This method significantly increases the interactivity and entertainingness of a red packet distribution process.

For example, in a red packet distribution scenario of distributing "Five Blessings Award" as shown in the drawings, the aforementioned electronic certificates may include five types of virtual blessing cards, namely "health blessing", "friendship blessing", "prosperity blessing", "family blessing" and "wealth blessing". The aforementioned image identifier may be any type of image identifiers with a word "blessing" in it. The user may actively scan the image identifier with the word "blessing" in the local environment using the AR client to cause the AR server to send an electronic certificate (a virtual blessing card) to the AR client. The virtual blessing cards send from the AR server may be saved in the AR client. After all five types of virtual blessing cards have been collected, the AR client may send a distribution request to the AR server to request a distribution of a red packet. Upon receiving the distribution request from the AR client, the AR server may select a red packet of a certain monetary amount and distribute it to the user.

The technical solution shown in steps 101-106 will be described in details below in the three stages of "receiving electronic certificates", "verifying category count of the electronic certificates" and "distributing red packets".

(1) "Receiving Electronic Certificates"

In an initial state, a certain number of different categories of electronic certificates can be preset on the AR server. The preset electronic certificates may be collectively managed by the AR server, and they may be the only certificates that allow the user to receive the distribution of the red packets. The number and category count of the preset electronic certificates may be set based on actual needs.

Besides the certain number of different categories of electronic certificates, a preset image identifier may also be defined on the AR server, and the preset image identifier may be associated with the preset electronic certificates.

When a user finds any form of preset image identifier in the local environment, the user may perform an image scanning on the preset image identifier using an image scanning function of the AR client. The image scanning may cause the AR server to send an electronic certificate to the AR client. The electronic certificates the AR client received may be saved in the AR client and may be used to request a distribution of a red packet from the AR sever.

In some embodiments, the AR client may provide an image scanning function to the user by default. For example, the image scanning function may be a "scanning" button provided for the user in a user homepage of the AR client. When the user needs to perform an image scanning on the local preset image identifier using the AR client, the user may use the image scanning function by "clicking" on the button or by other methods to enter an image scanning interface of the AR client.

Figure 2:
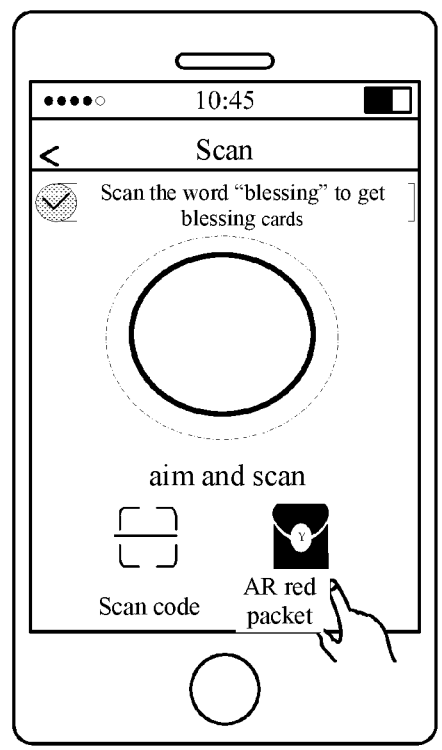
FIG. 2 shows a schematic diagram illustrating an image scanning interface of an AR client in this application.

FIG. 2 shows a schematic diagram illustrating an image scanning interface of an AR client in this application.

Referring to FIG. 2, in the aforementioned image scanning interface of the AR client, in addition to providing the user with the traditional "scan code" button and other functional buttons, an "AR red packet" function button may also be provided. By "clicking" the button or by other methods, the user may cause the AR client to enter the image scanning interface to complete the image scanning operation on the preset image identifier in the local environment of the user.

In some embodiments, the image scanning interface may be a real-time scanning interface. That is, a background picture of the image scanning interface can be a real scene picture of the user's local environment.

Referring back to FIG. 2, after the AR client enters the image scanning interface shown in FIG. 2, an image scanning prompt may be further displayed in the image scanning page.

The aforementioned image scanning prompt may include a dynamic scanning frame for prompting the user to perform an image scanning on the local environment, and a prompt text displayed in the image scanning page.

As shown in FIG. 2, the aforementioned image scanning prompt may include a circular scanning frame dynamically rotating at a center of the picture, and a prompt text of "aim and scan" permanently displayed below the scanning frame.

The content of the prompt text can be dynamically updated in actual applications. For example, when the AR client scans the local environment, the prompt text can be updated to "scanning"; and when the AR client fails to identify any local target through a loaded image identification algorithm, resulting in a failure of this scanning, the prompt text can be updated to "please keep the lens stable", "try another place", or other similar texts prompting the user to scan again.

In some embodiments, after the AR client displays the image scanning prompt in the image scanning page, the AR client can use a camera on an AR terminal (e.g., smart phone, or AR glasses) to perform an image scanning on the local environment of the user. Then image identification may be conducted on the scanned real scene image.

The AR client may perform image identification on the scanned image based on a client image identification model on the AR client. Alternatively, the AR client may upload the scanned image to the AR server, so that the AR server may perform image identification based on a server image identification model on the AR server.

In some embodiments, the client image identification model may be loaded to the AR client. After scanning the image of the local environment using the camera of the AR client, the AR client can continue to perform image identification on the scanned image based on the client image identification model. After the image identification, the AR client may upload the identification result to the AR server.

In some embodiments, the AR client may not be loaded with the client image identification model and therefore does not perform image identification. Instead, the AR client may upload the scanned image to the AR server, so that the AR server may perform image identification on scanned image based on a server image identification model loaded on the AR server. After the image identification, the identification result will be sent back to the AR client.

Any image identification algorithm that is well known to persons of ordinary skill in the art may be used for the image identification. Those skilled in the art may refer to records in relevant technologies when implementing the technical solution of this application. For example, in one implementation, the aforementioned image identification model may be a depth learning model based on neural network training combined with a large number of image identification samples.

In some embodiments, after the image identification, the AR server may determine whether the aforementioned preset image identifier is identified in the image scanned by the AR client. If it is determined that the preset image identifier is successfully identified in the real scene image scanned by the AR client, the AR server may select a corresponding electronic certificate from a preset electronic certificate set and distribute it to the user through the AR client.

In some embodiments, when selecting an electronic certificate, the AR server may randomly select an electronic certificate from the preset electronic certificate set.

Alternatively, in some embodiments, the AR server may select an electronic certificate from the preset electronic certificate set based on a preset distribution rule.

When distributing the electronic certificate to the AR client, the AR server may directly distribute the electronic certificate to the AR client. Alternatively, the AR server may only distribute a unique identifier corresponding to the electronic certificate to the AR client. In the latter case, a correspondence between the unique identifier and the electronic certificate may be saved locally in the AR client, and subsequently the AR client may identify the corresponding electronic certificate through the unique identifier.

In an example that an electronic certificate is a virtual card, the AR server may directly distribute a virtual card to the AR client. Alternatively, the AR server may generate a unique corresponding identifier for the virtual card and distribute only the identifier to the AR client. Upon receiving the identifier, the AR client may render a corresponding virtual card based on the identifier and display it locally.

In some embodiments, in order to prevent the electronic certificates from being counterfeited, the AR server may encrypt the electronic certificates through a preset encryption algorithm before distributing the electronic certificates to the AR client. After receiving an encrypted electronic certificate, the AR client may decrypt the electronic certificate with a decryption key corresponding to the encryption algorithm. In this way, the electronic certificates can be prevented from being counterfeited by malicious users.

In some embodiments, a category count of the electronic certificates distributed by the AR server to the AR client may be smaller than the above predetermined threshold. That is, the number of categories of the electronic certificates transmitted by the AR server to the AR client will be smaller than the preset threshold.

In the aforementioned example, the electronic certificates are visual cards, and a user needs to receive all five categories of electronic certificates (virtual cards) before he/she can send the AR server a distribution request for a red packet. When the AR server distributes the electronic certificates (virtual cards) to the AR client, the category count of the electronic certificates (virtual cards) in each distribution may be a number less than five (e.g., three). Thus, a number of users that can request the distribution of a red packet can be effectively controlled.

In addition, the distribution rule adopted by the AR server in distributing the electronic certificates to the AR client may also be customized according to actual needs.

In some embodiments, the aforementioned distribution rule may include selectively distributing to specific groups of people.

In some embodiments, the electronic certificate set in the AR server may comprise a low-frequency certificate set and a high-frequency certificate set. The electronic certificates in the low-frequency certificate set may be distributed to specific users designated by the AR server, while the electronic certificates in the high-frequency certificate set can be distributed to ordinary users.

In some embodiments, the aforementioned specific users may refer to users with a high activity level. When distributing electronic certificates, the AR server may give preferences to users with high activity levels. That is, users with high activity levels may be given priority when receiving electronic certificates in the low-frequency certificate set, while electronic certificates in the high-frequency certificate set may be distributed to all the users without any preference.

More specifically, when distributing an electronic certificate to a user, the AR server may first calculate an activity level of that user, and then compare the calculated activity level with an activity threshold to determine whether the user is an active user. If the activity level of the user reaches the activity threshold, the AR server may determine that the user is an active user, and may select an electronic certificate from the low-frequency certificate set and distribute it to the user through the AR client.

In some embodiments, upon determining that a user is an active user, the AR server may select electronic certificates exclusively from the low-frequency certificate set and send the same to the user. Alternatively, the AR server may also select electronic certificates from both the low-frequency certificate set and the high-frequency certificate set and send the same to the user. In the latter case, at least one of the electronic certificates selected and sent to the user comes from the low-frequency certificate set. For ordinary users with low activity, the AR server may only select electronic certificates from the high-frequency certificate set and send the same to those users.

In the embodiments described above, users with high activity levels are "rewarded" with higher chances of obtaining relatively "rare" electronic certificates from the low-frequency certificate set than ordinary users. That encourages more user participation to an associated application.

When the AR server calculates an activity level of a user, the activity level can be characterized based on parameters related to the daily activities of the user. For example, in some embodiments, it may be defined that the more friends a user has, or the more services a user uses, the higher activity level the user has. Therefore, the parameters related to the daily activities may include a number of friends of the user, a number of services used, etc. When calculating an activity level of a user, the AR server may count the number of friends of the user or the number of services used by the user, and determine whether the user is an active user by comparing those numbers with corresponding thresholds.

In some embodiments, the parameters characterizing an activity level of a user are not limited to the number of friends and the number of services used, as described above. Other parameters that can characterize the activity level of a user may also be used to calculate the activity level of the user.

In some embodiments, in addition to scanning the preset image identifier in the local environment through the AR client to cause the AR server to distribute an electronic certificate to the AR client, the user may also receive an electronic certificate by acquiring an electronic certificate shared by another user through the same AR client.

For example, in the example wherein the electronic certificate is a visual card, the AR client may be an Alipay client with AR service functions, and the Alipay client may have a sharing interface. A sharing user may share a virtual card to the user within the Alipay client through the sharing user's own Alipay client. Alternatively, the sharing user may share a virtual card on a third-party social platform or instant messaging software in the form of a link or a clickable picture/text through the sharing interface provided by the Alipay client. After receiving the virtual card shared by a sharing user, the user may save the electronic certificate to the AR client by clicking on the link or the clickable picture/text.

In some embodiments, after receiving the electronic certificate distributed by the AR server by scanning the preset image identifier, the AR client may generate a display picture corresponding to the electronic certificate, and then perform visual rendering on the display picture based on an AR engine of the AR client. The display picture may be superposed and integrated with the real scene image based on a position of the preset image identifier in the image, and be augmentatively displayed to the user at a position corresponding to the image identifier in the image. A receiving option corresponding to the display picture may be displayed in the image.

A detail implementation of the aforementioned augment displaying scheme is not limited in this application. In some implementations, the display picture may be dynamically popped up and dynamically displayed starting from the position corresponding to the preset image identifier in the image.

The aforementioned receiving option may be a function button for receiving an electronic certificate corresponding to the display picture. A user may trigger the function button by "clicking" or other methods to receive an electronic certificate corresponding to the display picture, to add the generated display picture to a local display position corresponding to the electronic certificate, and to save the electronic certificates in the AR client.

The display picture generated by the AR client for the electronic certificate may correspond to a type of the electronic certificate. Therefore, display pictures corresponding to different categories of electronic certificates may be different from each other. The contents shown in the aforementioned display picture is not particularly limited. Meanwhile, a local display position provided by the AR client in a user interface may also correspond to a type of the electronic certificate, therefore local display positions corresponding to different categories of electronic certificates may be different.

In addition, after adding the generated display picture to the corresponding display position, the AR client may display a number of the currently obtained electronic certificates on the local display position. For example, a digital reminder may be generated in an upper right corner of the display position. Moreover, when the number of a certain type of electronic certificates changes, the AR client can also update the corresponding number displayed on the local display position based on a number of remaining electronic certificates.

In some embodiments, a user can share the their electronic certificates with each other. More specifically, a user may share the electronic certificate corresponding to the display picture with other users by "triggering" the display picture in the local display position.

In some embodiments, in response to an image-triggering operation of the user on the display picture, a sharing page comprising a plurality of applications may be entered. Then, the user may share the electronic certificate corresponding to the display picture to a third-party user designated by the user through one of the applications designated by the user in the sharing page.

For example, when a user wants to share a certain type of electronic certificate to a target user, the user can activate a local display position of the display picture corresponding to that type of electronic certificate by clicking or other methods. When the local display position is activated, the display picture corresponding to the local display position may be displayed in the user interface.

At this time, a sharing option can be provided in the display picture. For example, when the electronic certificate is a virtual card, the sharing option can be a clickable option of "send one to a friend". After the user activates the clickable option through a triggering operation such as a clicking, the AR client may display a sharing mode selection interface in which several target applications that can be selected by the user are provided. Then, the user may designate a corresponding target application in the selection interface, and then further designate a target user to share in the target application. When the designations are completed, the AR client can distribute the electronic certificate to the target user designated by the user.

When a target user the user shared with is a contact or a friend of the user in the AR client, the user may share the electronic certificate within the AR client. In this case, the AR client may send the to-be-shared electronic certificate to the AR client of the target user through the AR server.

On the other hand, if the target user is not a contact or a friend of the user in the AR client, but a contact or a friend of the user in a third-party client, the user may also share the electronic certificate with the target user through the third-party client. In this case, the AR client may generate a corresponding access link for the to-be-shared electronic certificate through the AR server, and share the access link to the target user through the third-party client.

(2) "Verification of Category Count of Electronic Certificates"

In some embodiments, after a user receives electronic certificates through one of the two receiving methods described above, the AR client may determine in the background whether a category count of received electronic certificates reaches a preset threshold. If the preset threshold is reached, the user may send a virtual object distribution request (in this case, a virtual red packet distribution request) to the AR server. The distribution request may include a plurality of electronic certificates, and a category count of the included electronic certificates may equal to the preset threshold.

In some embodiments, in the virtual red packet distribution request, the number of the electronic certificates and the category count of the electronic certificates may both equal to the preset threshold (i.e., one electronic certificate per category). Upon receiving the virtual object distribution request, the AR server may collect the electronic certificates in the distribution request and verify that the category count of the electronic certificates reaches the preset threshold.

The AR client may automatically send the virtual object distribution request (the virtual red packet distribution request) once it determines that category count of the received electronic certificates reaches a first number. Alternatively, the distribution request may be triggered by a user input.

For example, when the AR client determines in the background that the category count of the received electronic certificates reaches a first number, the AR client may automatically send a virtual red packet distribution request to the AR server. Alternatively, a trigger button for the AR client to send a virtual object distribution request to the AR server may be provided at the display position corresponding to the electronic certificate. When the AR client determines in the background that the category count of received electronic certificates reaches the preset threshold, the AR client may display a prompt and a corresponding actionable button to the user to remind the user that a distribution request for a virtual object (a red packet) is available. Once the user triggers the operation by, for example, clicking the actionable button, the AR client may send the virtual object distribution request (the red packet distribution request) to the AR server.

In some embodiments, the AR server may verify the category count of the electronic certificates contained in the red packet distribution request from the AR client. If the AR server determines that the category count of the electronic certificates contained in the red packet distribution request reaches the preset threshold, a permission of distributing a red packet may be granted, and a red packet of a certain monetary amount may be immediately distributed to the user from the preset "red packet cash pool" (equivalent to the above preset virtual object set) based on a preset distribution rule. Alternatively, a red packet of a certain monetary amount may also be distributed to the user from the preset "red packet cash pool" based on the preset distribution rule at a specific red packet distribution time.

(3) "Distribution of Red Packets"

In some embodiments, the distribution rule adopted by the AR server for distributing a red packet to the user from the preset "red packet cash pool" may be made based on actual business requirements.

In some embodiments, the AR server may count a number of users who have been granted the permission of distributing the red packets, and calculate an average per-user monetary amount for all the red packets to be distributed in the "red packet cash pool" based on the counted user number. In this application, the calculated per-user monetary amount is an average monetary amount in a red packet to be distributed to each user. The AR server may distribute a red packet having a corresponding amount from the "red packet cash pool" to each user based on the average per-user monetary amount.

In some embodiments, the AR server may also send a red packet of a random monetary amount from the "red packet cash pool" when distributing a red packet to a user. For example, the AR server may calculate a random monetary amount for a user based on a preset randomization algorithm combined with the total amount of red packets to be distributed in the "red packet cash pool". The AR server then may distribute a red packet of that random monetary amount to the user.

Obviously, in addition to the distribution rules described above, other distribution rules may also be used in actual applications.

In some embodiments, after successfully distributing the red packets to the users, the AR server may also send an distribution result to the AR client where the user is located. The AR client may display the distribution result to the user after receiving the distribution result.

The distribution result may include one or more of a total monetary amount of distributed red packets, a sender of the distributed red packets, other receivers of the distributed red packets, a number of other receivers, and a distribution rule.

The technical solution in these embodiments will be described in details below with reference to specific application scenarios.

Figure 4:
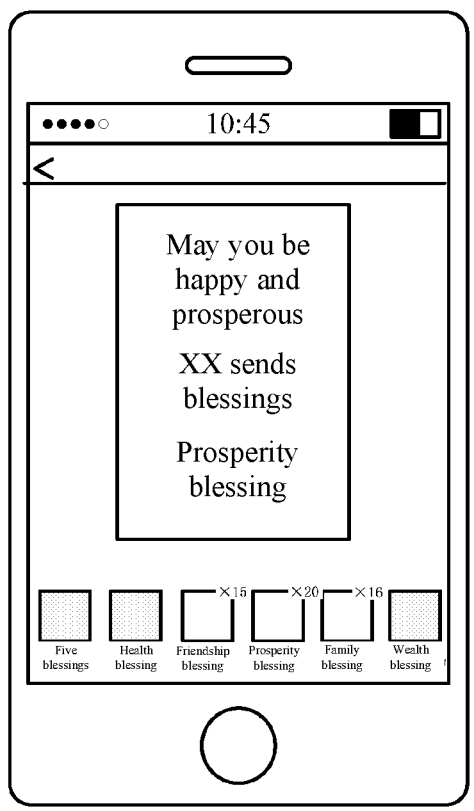
FIG. 4 shows a schematic diagram illustrating an AR client displaying collected virtual blessing cards in this application.
Figure 5:
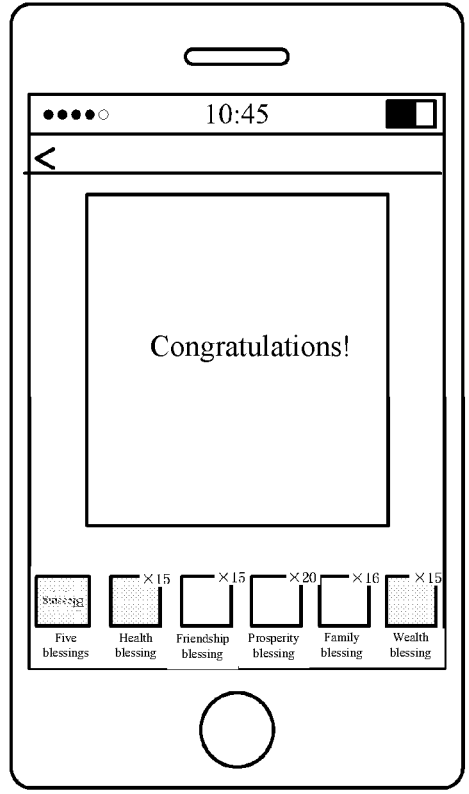
FIG. 5 shows a schematic diagram illustrating an AR client displaying collected virtual blessing cards in this application.

In a red packet distribution scenario of "Five Blessings Award" as shown in FIGS. 4 and 5, the AR client may be a payment client with AR service functions, and the AR server may be a payment platform with AR service functions. The AR server may be connected with an Alipay client. The virtual object set in the AR server may be a corporation account of a participating corporation cooperating with the payment platform. A total monetary amount of all the distributable red packets may be a balance of the corporation account.

In this example, the aforementioned electronic certificates may include five types of virtual blessing cards, namely "health blessing", "friendship blessing", "prosperity blessing", "family blessing" and "wealth blessing". The aforementioned preset image identifier can be any type of image identifier with the word "blessing" in a local environment of the user.

The user may actively scan the image identifier with the word "blessing" in the local environment using the AR client. The scanning may cause the AR server to distribute an electronic certificate (a virtual blessing card) to the AR client. Upon receiving all five types of electronic certificates (virtual blessing cards) from the AR server, the user will have a privilege to request a distribution of a red packet. The AR server may send the red packet to the user upon receiving the distribution request.

Among the five types of virtual blessing cards, the payment platform can designate some types as "rare" virtual blessing cards. For example, two of the five types of the virtual blessing cards may be designated as "rare" cards. The distribution of such "rare" virtual blessing cards depends on an activity level of the user, which may be calculated by the payment platform based on user data. That is, such "rare" virtual cards can be preferably or exclusively distributed to users who have high activity levels. On the other hand, for ordinary users who may not have high activity levels, the payment platform may only distribute the other three "regular" types of virtual blessing cards to them as a default rule.

When an image identifier with the word "blessing" is found in the local environment (for example, when a user sees a sticker with the word "blessing" in it), the user can perform an image scanning on the image identifier using the image scanning function of the AR client. The image scanning may cause the AR server to send a virtual blessing card to the AR client.

After the user completes the image scanning on the image identifier with the word "blessing" at the prompt of the image scanning prompt, which may be displayed in the image scanning interface as shown in FIG. 2, the AR client may perform image identification on the scanned image. Based on the image identification result, the AR server can determine whether the image identifier with the word "blessing" is identified in the image scanned by the AR client. If the image identifier with the word "blessing" is identified, the AR server may send an electronic certificate (in this case, a virtual blessing card) to the user through the AR client.

Figure 3:
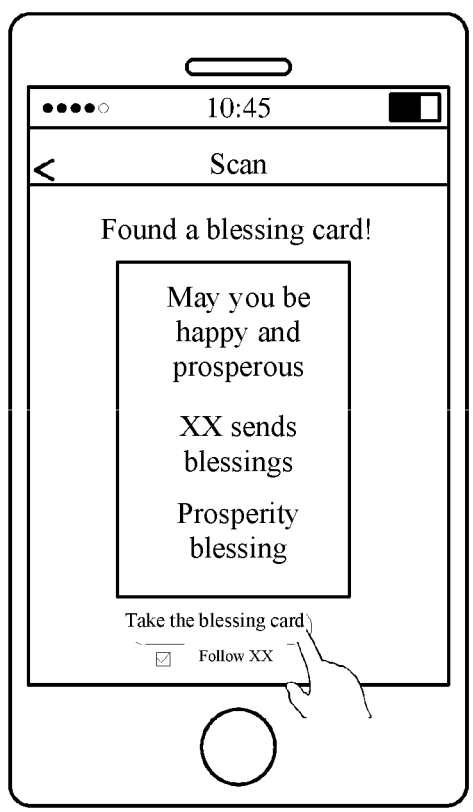
FIG. 3 shows a schematic diagram illustrating an AR client scanning a preset image identifier to obtain a virtual blessing card in this application.

FIG. 3 shows a schematic diagram illustrating an AR client scanning a preset image identifier to obtain a virtual blessing card in this application. Referring to FIG. 3, after obtaining a virtual blessing card from the AR server, the AR client may perform visual rendering on the virtual blessing card based on the AR engine in the foreground of the AR client. The visual rendering of the virtual blessing card may be superposed and integrated with the image based on a position of the image identifier in the image. The visual rendering of the virtual blessing card may be augmentatively displayed to the user (for example, as shown in FIG. 3, a "prosperity blessing" virtual blessing card is displayed on the AR client), and a "take the blessing card" function button may be displayed at a position corresponding to the AR virtual blessing card, as shown in FIG. 3. The user may click the "take the blessing card" function button to confirm the reception of the electronic certificate (virtual blessing card).

In some embodiments, the user may trigger the "take the blessing card" function button by "clicking" the corresponding button or by other methods. In response to the user's option-triggering operation, the AR client may generate a display picture corresponding to the virtual card, and display the display picture in an active interface. The contents on the display pictures generated by the AR client for different types of virtual cards may be different from each other. Display positions provided by the client for virtual blessing cards can correspond to the types of virtual cards, and each type of virtual cards can correspond to one display position respectively.

FIG. 4 shows a schematic diagram illustrating an AR client displaying collected virtual blessing cards in this application. Referring to FIG. 4, the AR client may provide a display location for each of the five types of virtual blessing cards, namely "health blessing", "friendship blessing", "prosperity blessing", "family blessing" and "wealth blessing", in the user interface. After adding the display picture to the corresponding display position, the client may also mark a number for each type of electronic certificates acquired (the corresponding virtual cards received) at a preset local display position (for example, upper right corner as shown in FIG. 4). The AR client may update the number of acquired electronic certificates when it changes. The number of acquired electronic certificates may increase when new electronic certificate is received from the AR server, or decrease when the AR client sends a distribution request that includes a plurality of electronic certificates to the AR server.

When the user successfully receives all five types of virtual cards, namely "health blessing", "friendship blessing", "prosperity blessing", "family blessing" and "wealth blessing", by acquiring the virtual cards from the payment platform or from other friends, the user may obtain a privilege to request a distribution of a virtual object, which, in this case, is a "Five Blessings" red packet.

FIG. 5 shows a schematic diagram illustrating an AR client displaying collected virtual blessing cards in this application. Referring to FIG. 5, the AR client may provide a display location for "Five Blessings" in the user interface after the user successfully receives all five types of virtual cards, namely "health blessing", "friendship blessing", "prosperity blessing", "family blessing" and "wealth blessing". The display location of "five blessings" can be highlighted, such as by color, to remind the user that the user currently has a privilege to request a "five blessings" red packet.

After the user obtains the privilege of receiving a "five blessings" red packet, the user can manually click the "five blessings" display position to cause the AR client to send a red packet distribution request to the AR server (the payment platform). Alternatively, the AR client may automatically send a red packet distribution request to the AR server (the payment platform). The red packet distribution request may contain all five types of received virtual cards. Upon receiving the distribution request, the payment platform may verify that all five types of the virtual cards are present in the distribution request. If the payment platform determines that the distribution request contains all five types of virtual cards, the payment platform may immediately distribute a red packet of a certain monetary amount. The monetary balance of the red packet may come the aforementioned corporation account. Alternatively, the payment platform may choose to send a red packet of a certain monetary amount to the user at a certain distribution time. The payment platform may determine the number of all users who obtain the privilege of receiving the "five blessings" red packets, and divide the available fund in the corporation account evenly, so that each user may receive substantially same monetary value in the red packet they received.

After the user receives a red packet, the payment platform can push a red packet distribution result to the client, and the client can display the distribution result to the user in the activity interface.

Figure 6:
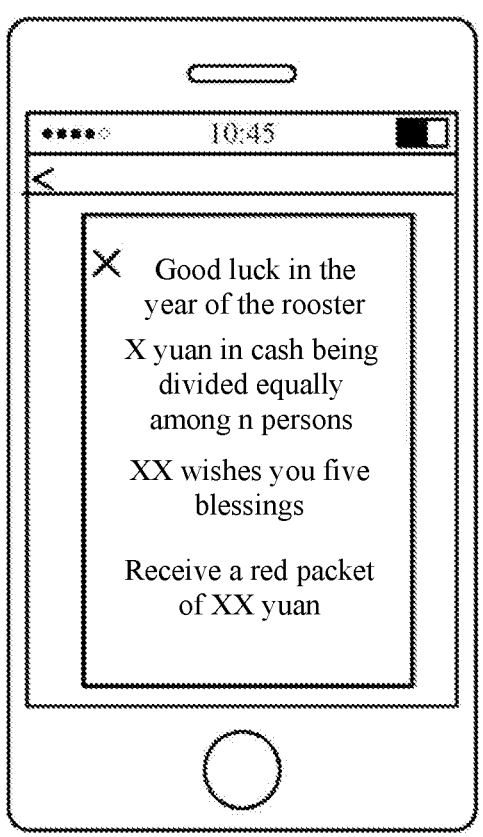
FIG. 6 shows a schematic diagram illustrating an AR client displaying a distribution result of "five-blessing red packets" in this application.

FIG. 6 shows a schematic diagram illustrating an AR client displaying a distribution result of "five-blessing red packets" in this application. Referring to FIG. 6, information displayed in the red packet distribution result may include a monetary amount in the red packet received, a sender of the red packet (name of the corporation cooperating with the payment platform), a total number of people received the "Five Blessings" red packets, an distribution rule of the "Five Blessings" red packets (the distribution rule shown in FIG. 6 is average distribution), etc.

Corresponding to the aforementioned methods of distributing a virtual object, this application further provides a device for distributing a virtual object for an AR client.

Figure 7:
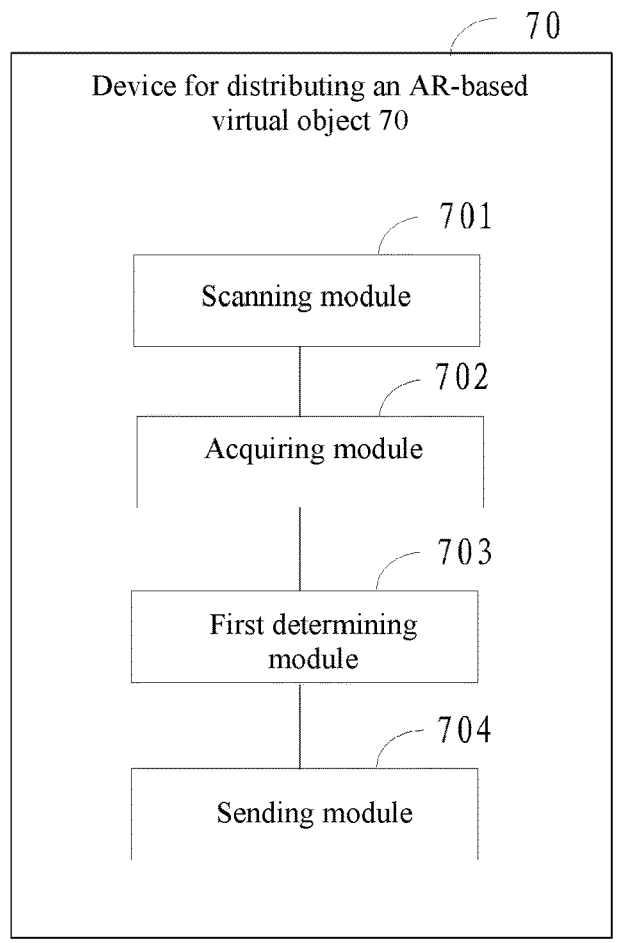
FIG. 7 shows a logical block diagram illustrating a device for distributing a virtual object for an AR client in this applications.
Figure 8:
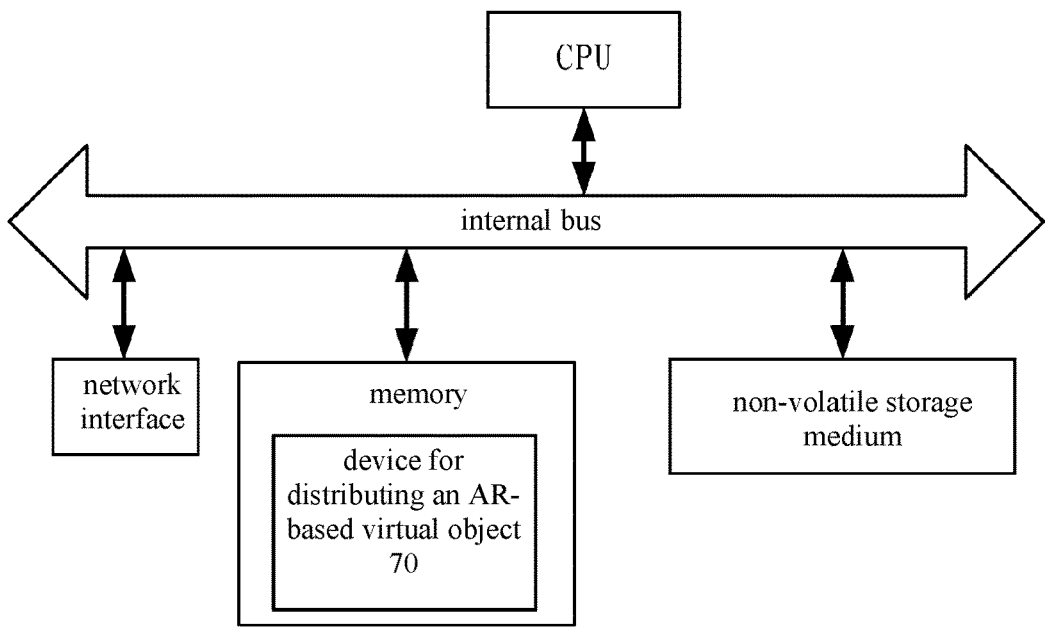
FIG. 8 shows a hardware structural diagram illustrating an AR client hosting a device for distributing a virtual object in this application.

FIG. 7 shows a logical block diagram illustrating a device for distributing a virtual object for an AR client in this application. FIG. 8 shows a hardware structural diagram illustrating an AR client hosting a device for distributing a virtual object in this application. Referring to FIG. 8, an AR client hosting the device 70 for distributing a virtual object may include a CPU, a memory, a non-volatile storage medium, a network interface, and an internal bus, etc. Taking software implementation as an example, the device 70 for distributing a virtual object may be generally understood as a logic device formed by running a computer program loaded in the memory by the CPU. The device 70 may be considered a combination of software and hardware.

The device 70 may include a scanning module 701 which, in response to an image scanning operation of a user, performs an image scanning on a local environment of the user, an acquiring module 702 which performs image identification with respect to an image acquired by the scanning, and acquires an electronic certificate transmitted from an AR server when a preset image identifier is identified in the image. The acquiring module 702 may, upon receiving the electronic certificate, save the electronic certificate locally. The received electronic certificates may be used for obtaining a virtual object.

The device 70 may further include a first determining module 703 which determines whether a category count of received electronic certificates reaches a preset threshold, and a sending module 704 which sends to the AR server a virtual object distribution request. The virtual object distribution request may contain a plurality of electronic certificates having a category count equal to the preset threshold. If the category count of the received electronic certificates reaches the preset threshold, the AR server may select a virtual object from a preset virtual object set and distribute it to the user.

In the aforementioned device, the acquiring module 702 may perform image identification on the scanned image based on a client image identification model saved in the AR client, and send a request for an electronic certificate to the AR server when the preset image identifier is identified in the image. The AR client may acquire the electronic certificate transmitted from the AR server upon receiving the request.

Alternatively, in the aforementioned device, the acquiring module 702 may also upload the scanned image to the AR server, so that the AR server can perform image identification on the image based on a server image identification model saved on the AR server.

The acquiring module 702 may acquire the electronic certificate transmitted from the AR server when the preset image identifier is identified in the image.

In the aforementioned device, the acquiring module 702 may further acquire a shared electronic certificate shared by another user locally and saves the shared electronic certificate to the AR client.

The acquiring module 702 may generate a display picture corresponding to the electronic certificate, augmentatively display the display picture at a position corresponding to the preset image identifier in the image, and display a receiving option corresponding to the display picture in the image.

The acquiring module 702 may display the display picture at a local display position corresponding to the electronic certificate in response to an option-triggering operation of the user on the receiving option. The display pictures corresponding to different categories of electronic certificates may be different, and local display positions corresponding to different categories of electronic certificates may be different.

In some embodiments, the acquiring module 702 may display a number of acquired electronic certificates on the local display position, and update the number based on a number of remaining electronic certificates.

In some embodiments, the device 70 may further include a sharing module 705 (not shown in FIG. 7) which, upon detecting a preset triggering operation on any display picture of the user, enters a sharing page corresponding to a target user. The sharing page may include a plurality of preset target applications. The sharing module 705 may share the electronic certificate corresponding to the display picture to a third-party user designated by the user through the target application designated by the user in the sharing page.

In this embodiment, the device 70 may further include a first receiving module 706 (not shown in FIG. 7) which receives a distribution result of the virtual objects sent by the AR server and displays the distribution result to the user. The distribution result may include one or more of the following information: a number of distributed virtual objects, a sender of the distributed virtual objects, a number of other receivers of the distributed virtual objects, and a distribution rule.

In some embodiments, the virtual object may be a virtual red packet.

Figure 9:
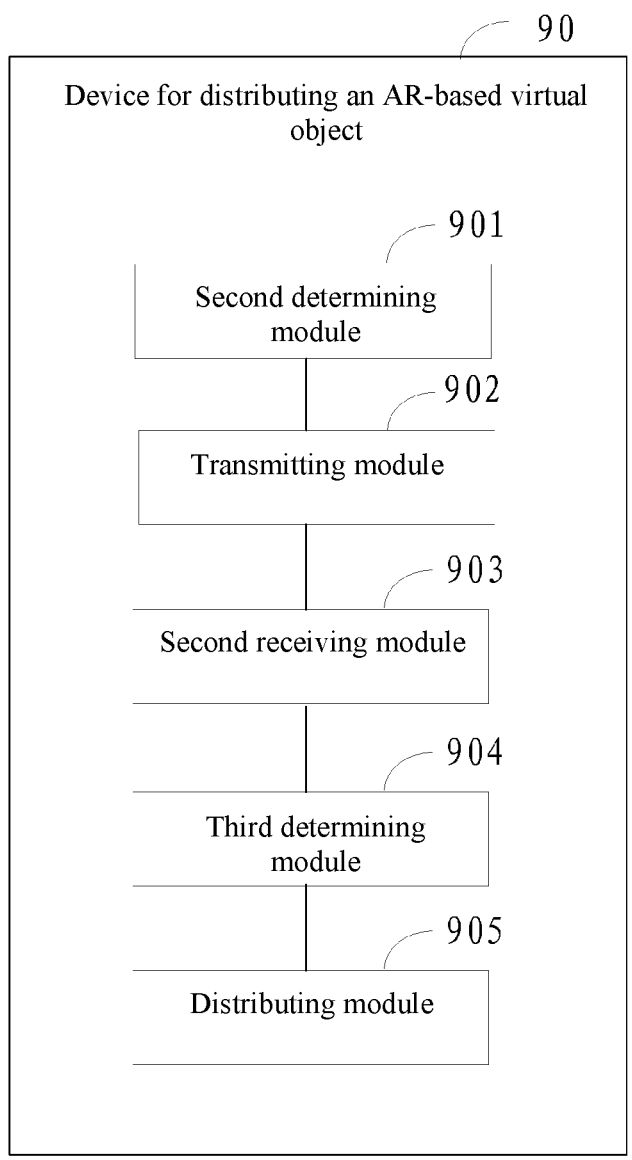
FIG. 9 shows a logical block diagram illustrating a device for distributing a virtual object for an AR client in this application.
Figure 10:
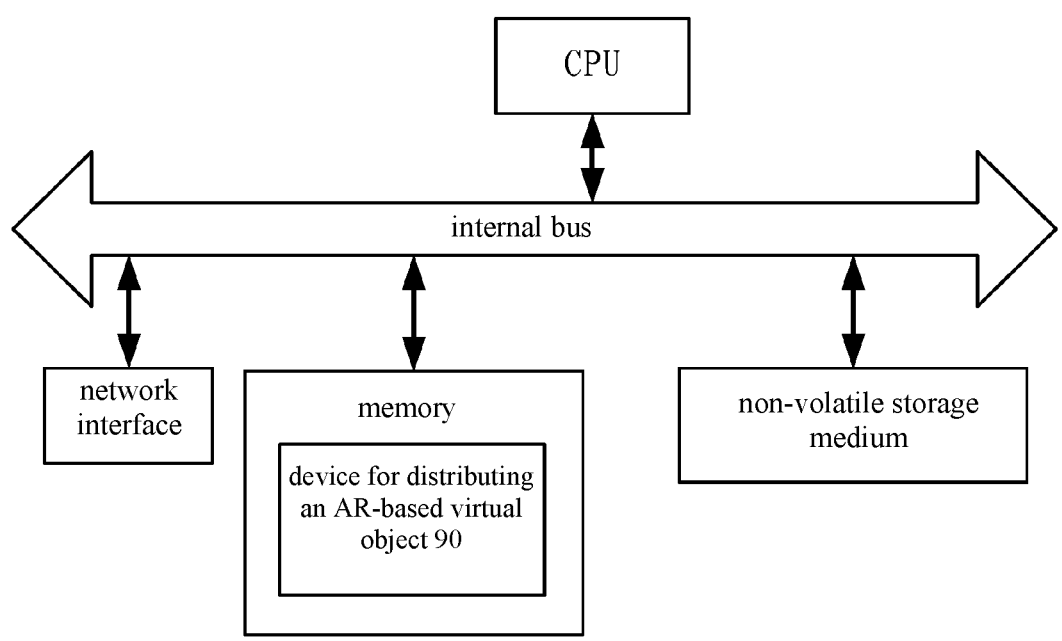
FIG. 10 shows a hardware structure diagram illustrating an AR client hosting a device for distributing a virtual object in this application.

FIG. 9 shows a logical block diagram illustrating a device for distributing a virtual object for an AR server in this application. FIG. 10 shows a hardware structure diagram illustrating an AR server hosting a device for distributing a virtual object in this application. Referring to FIG. 10, an AR server hosting a device 90 for distributing a virtual object may include a CPU, a memory, a non-volatile storage medium, a network interface, and an internal bus, etc. Taking software implementation as an example, the device 90 for distributing a virtual object may be generally understood as a logic device formed by running a computer program loaded in the memory by the CPU. The device 90 may be considered a combination of software and hardware.

The device 90 may include a second determining module 901 which, in response to a user performing, using an AR client, an image scanning on a local environment, determines whether a preset image identifier is identified in an image acquired by the AR client, and a transmitting module 902 which transmits to the AR client an electronic certificate if the preset image identifier is identified in the image. The electronic certificate may be used for obtaining a virtual object.

The device 90 may further comprise a second receiving module 903 which receives a virtual object distribution request sent by the AR client, and a third determining module 904 which determines whether a category count of the electronic certificates contained in the virtual object distribution request reaches a preset threshold. The object distribution request may contain a plurality of electronic certificates for obtaining a virtual object.

The device 90 may further include a distributing module 905 which distributes a virtual object from a preset virtual object set to the user based on a preset distribution rule, if the category count of the electronic certificates contained in the virtual object distribution request reaches the preset threshold.

In the aforementioned device, the transmitting module 902 may randomly select an electronic certificate from a local preset electronic certificate set and send it to the AR client.

Alternatively, the transmitting module 902 may select an electronic certificate from the local preset electronic certificate set according to a preset distribution rule, and send the electronic certificate to the AR client.

In some embodiments, the category count of the electronic certificates transmitted from the AR server to the AR client may be smaller than the preset threshold.

In some embodiments, the local preset electronic certificate set may include a low-frequency certificate set and a high-frequency certificate set.

The transmitting module 902 may be further configured to calculate an activity level of the user, and determine whether the activity level of the user reaches an activity threshold. If the activity level reaches the activity threshold, the transmitting module 902 may select an electronic certificate from the low-frequency certificate set and send it to the AR client. Alternatively, the transmitting module 902 may also select electronic certificates from the low-frequency certificate set and the high-frequency certificate set and send the electronic certificates to the AR client. At least one electronic certificate selected by the transmitting module 902 may come from the low-frequency certificate set.

In some embodiments, the transmitting module 902 may be further configured to send an distribution result of the virtual objects to the AR client when the distribution of a virtual object to the user is completed. The AR client may display the distribution result to the user. The distribution result may include one or more of the following information: a number of distributed virtual objects, a sender of the distributed virtual objects, a number of other receivers of the distributed virtual objects, and a distribution rule.

One of ordinary skill in the art can understand details about the operation and processes of the system and apparatus described above by referring to corresponding processes in the method embodiments described above. In some embodiments, the division of the modules may be logical or functional. Alternative methods of division may be used. Multiple modules or components may be combined or integrated into another system. Some features may be omitted or not executed. The mutual coupling, direct coupling, or communication connection that is illustrated or discussed may be replaced by indirect coupling or communication connection through suitable communication interfaces, apparatuses, or modules, which may be electrical, mechanical, or in other suitable forms.

Each of the processes, methods, and algorithms described in the preceding sections may be embodied in, and fully or partially automated by, software or code modules executed by one or more computer systems or computer processors comprising computer hardware. The processes and algorithms may be implemented partially or wholly in application-specific circuitry.

The software or code modules may be implemented as separated sections or blocks of program code. One or more of the software or code modules may alternatively be integrated into one section or block of program code. When the functions disclosed herein are implemented in the form of software functional modules and sold or used as independent products, they can be stored in a processor executable non-volatile computer readable storage medium. Particular technical solutions disclosed herein (in whole or in part) or aspects that contributes to current technologies may be embodied in the form of a software product. The software product may be stored in a storage medium, comprising a number of instructions to cause a computing device (which may be a personal computer, a server, a network device, and the like) to execute all or some steps of the methods of the embodiments of the present application. The storage medium may comprise a flash drive, a portable hard drive, ROM, RAM, a magnetic disk, an optical disc, another medium operable to store program code, or any combination thereof.

Particular embodiments further provide a system comprising a processor and a non-transitory computer-readable storage medium storing instructions executable by the processor to cause the system to perform operations corresponding to steps in any method of the embodiments disclosed above. Particular embodiments further provide a non-transitory computer-readable storage medium configured with instructions executable by one or more processors to cause the one or more processors to perform operations corresponding to steps in any method of the embodiments disclosed above.

Embodiments disclosed herein may be implemented through a cloud platform, a server or a server group (hereinafter collectively the "service system") that interacts with a client. The client may be a terminal device or a client registered by a user at a platform, wherein the terminal device may be a mobile terminal, a personal computer (PC), and any device that may be installed with a platform application program.

The various features and processes described above may be used independently of one another or may be combined in various ways. All possible combinations and sub-combinations are intended to fall within the scope of this specification. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The exemplary systems and components described herein may be configured differently than described. For example, elements may be added to, removed from, or rearranged compared to the disclosed example embodiments.

The various operations of exemplary methods described herein may be performed, at least partially, by an algorithm. The algorithm may be comprised in program codes or instructions stored in a memory (e.g., a non-transitory computer-readable storage medium described above). Such algorithm may comprise a machine learning algorithm. In some embodiments, a machine learning algorithm may not explicitly program computers to perform a function but can learn from training data to make a predictions model that performs the function.

The various operations of exemplary methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present specification. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this specification. The Detailed Description, therefore, is not to be taken in a limiting sense, and the scope of various embodiments is defined only by the appended claims, along with the full range of equivalents to which such claims are entitled.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

As used herein, the term "or" may be construed in either an inclusive or exclusive sense. Moreover, plural instances may be provided for resources, operations, or structures described herein as a single instance. Additionally, boundaries between various resources, operations, engines, and data stores are somewhat arbitrary, and particular operations are illustrated in a context of specific illustrative configurations. Other allocations of functionality are envisioned and may fall within a scope of various embodiments of the present specification. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present specification as represented by the appended claims. The specification and drawings are, accordingly, to be regarded in an illustrative rather than a restrictive sense.

The term "include" or "comprise" is used to indicate the existence of the subsequently declared features, but it does not exclude the addition of other features. Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

What is claimed is:

1. A virtual object distribution method, comprising:
    performing an image scanning on a local environment of a user to acquire an image of the local environment;
    conducting image identification to the image of the local environment;
    determining whether any one of a plurality of image identifiers is identified in the image of the local environment, wherein the plurality of image identifiers each have a same word and are associated with electronic certificates of a plurality of categories;
    acquiring, in response to a determination that one of the plurality of image identifiers is identified in the image of the local environment, wherein the identified image identifier is a part of the local environment, an electronic certificate of any one of the plurality of categories from a server;
    saving the electronic certificate;

determining whether a category count of received electronic certificates reaches a threshold; and in response to a determination that the category count reaches the threshold, sending to the server a virtual object distribution request containing a plurality of electronic certificates having a category count equals to the threshold to cause the server to distribute a virtual object to the user, wherein the saving the electronic certificate comprises:
generating a display picture corresponding to the electronic certificate; and
augmentatively displaying the display picture superposed and integrated with a real scene image of the local environment of the user at a position corresponding to the image identifier in the image of the local environment, wherein display pictures corresponding to different categories of electronic certificates are different, and local display positions corresponding to different categories of electronic certificates are different.

2. The method of claim 1, wherein the conducting image identification to the image of the local environment comprises:
conducting image identification on the image based on a client image identification model, and
wherein the acquiring an electronic certificate of any one of the plurality of categories from a server comprises:
sending an electronic certificate acquisition request to the server; and
acquiring the electronic certificate that the server sends upon receiving the electronic certificate acquisition request.

3. The method of claim 1, wherein the conducting image identification to the image of the local environment comprises:
uploading the image to the server for the server to conduct image identification on the image based on a server image identification model on the server, and
wherein the acquiring an electronic certificate of any one of the plurality of categories from a server comprises:
acquiring the electronic certificate that the server sends upon identifying the image identifier in the image.

4. The method of claim 1, wherein the saving the electronic certificate further comprises:
displaying a receiving option corresponding to the display picture in the image; and
in response to an option-triggering operation of the user on the receiving option, displaying the display picture at a local display position corresponding to the electronic certificate.

5. The method of claim 4, further comprising:
displaying a number of acquired electronic certificates on the local display position; and
updating the number based on a number of remaining electronic certificates.

6. The method of claim 5, further comprising:
in response to an image-triggering operation of the user on the display picture, entering a sharing page comprising a plurality of applications; and
sharing the electronic certificate corresponding to the display picture to a third-party user designated by the user through one of the applications designated by the user in the sharing page.

7. The method of claim 1, further comprising:
receiving a distribution result from the server and displaying the distribution result to the user,
wherein the distribution result comprises one or more of:

a number of distributed virtual objects, a sender of the distributed virtual objects, a number of other receivers of the distributed virtual object, and a distribution rule.

8. The method of claim 1, wherein the acquiring an electronic certificate from a server comprises:
acquiring the electronic certificate randomly selected by the server from an electronic certificate set in the server; or
acquiring the electronic certificate selected by the server from an electronic certificate set in the server according to a distribution rule.

9. The method of claim 8, wherein the electronic certificate set comprises a low-frequency certificate set and a high-frequency certificate set,
and wherein the acquiring the electronic certificate selected by the server from an electronic certificate set in the server according to a distribution rule comprises:
calculating an activity level of the user;
determining whether the activity level reaches an activity threshold; and
in response to a determination that the activity level reaches the activity threshold, either acquiring the electronic certificate from the low-frequency certificate set, or, acquiring electronic certificates from the low-frequency certificate set and the high-frequency certificate set, with at least one of the electronic certificates from the low-frequency certificate set.

10. The method of claim 1, wherein the virtual object is a virtual red packet.

11. A device for distributing a virtual object, comprising one or more processors and one or more non-transitory machine-readable memories coupled to the one or more processors and configured with instructions executable by the one or more processors to cause the device to perform operations comprising:
performing an image scanning on a local environment of a user to acquire an image of the local environment;
conducting image identification to the image of the local environment;
determining whether any one of a plurality of image identifiers is identified in the image of the local environment, wherein the plurality of image identifiers each have a same word and are associated with electronic certificates of a plurality of categories;
acquiring, in response to a determination that one of the plurality of image identifiers is identified in the image of the local environment, wherein the identified image identifier is a part of the local environment, an electronic certificate of any one of the plurality of categories from a server;
saving the electronic certificate;
determining whether a category count of received electronic certificates reaches a threshold; and
in response to a determination that the category count reaches the threshold, sending to the server a virtual object distribution request containing a plurality of electronic certificates having a category count equals to the threshold to cause the server to distribute a virtual object to the user,
wherein the saving the electronic certificate comprises:
generating a display picture corresponding to the electronic certificate; and
augmentatively displaying the display picture superposed and integrated with a real scene image of the local environment of the user at a position corresponding to the image identifier in the image of the local environment, wherein display pictures corresponding to different categories of electronic certificates are different, and local display positions corresponding to different categories of electronic certificates are different.

12. The device of claim 11, wherein the conducting image identification to the image of the local environment comprises:
conducting image identification on the image based on a client image identification model,
and wherein the acquiring an electronic certificate of any one of the plurality of categories from a server comprises:
sending an electronic certificate acquisition request to the server; and
acquiring the electronic certificate that the server sends upon receiving the electronic certificate acquisition request.

13. The device of claim 11, wherein the conducting image identification to the image of the local environment comprises:
uploading the image to the server, wherein the server conducts image identification on the image based on a server image identification model on the server, and
wherein the acquiring an electronic certificate of any one of the plurality of categories from a server comprises:
acquiring the electronic certificate that the server sends upon identifying the image identifier in the image.

14. The device of claim 11, wherein the saving the electronic certificate further comprises:
displaying a receiving option corresponding to the display picture in the image; and
in response to an option-triggering operation of the user on the receiving option, displaying the display picture at a local display position corresponding to the electronic certificate.

15. The device of claim 14, wherein the operations further comprise:
displaying a number of acquired electronic certificates on the local display position; and
updating the number based on a number of remaining electronic certificates.

16. The device of claim 15, wherein the operations further comprise:
in response to an image-triggering operation of the user on the display picture, entering a sharing page comprising a plurality of applications; and
sharing the electronic certificate corresponding to the display picture to a third-party user designated by the user through one of the applications designated by the user in the sharing page.

17. The device of claim 11, wherein the operations further comprise:
receiving a distribution result from the server and displaying the distribution result to the user,
wherein the distribution result comprises one or more of:
a number of distributed virtual objects, a sender of the distributed virtual objects, a number of other receivers of the distributed virtual objects, and a distribution rule.

18. The device of claim 11, wherein the acquiring an electronic certificate from a server comprises:
acquiring the electronic certificate randomly selected by the server from an electronic certificate set in the server; or
acquiring the electronic certificate selected by the server from the electronic certificate set in the server according to a distribution rule.

19. A non-transitory computer-readable storage medium associated with a virtual object distribution method, configured with instructions executable by one or more processors to cause the one or more processor to perform operations comprising:
performing an image scanning on a local environment of a user to acquire an image of the local environment;
conducting image identification to the image of the local environment;
determining whether any one of a plurality of image identifiers is identified in the image of the local environment, wherein the plurality of image identifiers each have a same word and are associated with electronic certificates of a plurality of categories;
acquiring, in response to a determination that one of the plurality of image identifiers is identified in the image of the local environment, wherein the identified image identifier is a part of the local environment, an electronic certificate of any one of the plurality of categories from a server;
saving the electronic certificate;
determining whether a category count of received electronic certificates reaches a threshold; and
in response to a determination that the category count reaches the threshold, sending to the server a virtual object distribution request containing a plurality of electronic certificates having a category count equals to the threshold to cause the server to distribute a virtual object to the user,
wherein the saving the electronic certificate comprises:
generating a display picture corresponding to the electronic certificate; and
augmentatively displaying the display picture superposed and integrated with a real scene image of the local environment of the user at a position corresponding to the image identifier in the image of the local environment, wherein display pictures corresponding to different categories of electronic certificates are different, and local display positions corresponding to different categories of electronic certificates are different.

20. The non-transitory computer-readable storage medium of claim 19, wherein the conducting image identification to the image of the local environment comprises:
conducting image identification on the image based on a client image identification model,
and wherein the acquiring an electronic certificate of any one of the plurality of categories from a server comprises:
sending an electronic certificate acquisition request to the server; and
acquiring the electronic certificate that the server sends upon receiving the electronic certificate acquisition request.

* * * * *